(12) United States Patent
Mori

(10) Patent No.: US 10,776,937 B2
(45) Date of Patent: Sep. 15, 2020

(54) IMAGE PROCESSING APPARATUS AND IMAGE PROCESSING METHOD FOR SETTING MEASURING POINT TO CALCULATE THREE-DIMENSIONAL COORDINATES OF SUBJECT IMAGE WITH HIGH RELIABILITY

(71) Applicant: OLYMPUS CORPORATION, Hachioji-shi, Tokyo (JP)

(72) Inventor: Junichi Mori, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 46 days.

(21) Appl. No.: 16/185,109

(22) Filed: Nov. 9, 2018

(65) Prior Publication Data

US 2019/0080466 A1 Mar. 14, 2019

Related U.S. Application Data

(63) Continuation of application No. PCT/JP2017/016208, filed on Apr. 24, 2017.

(30) Foreign Application Priority Data

May 16, 2016 (WO) .................. PCT/JP2016/064461

(51) Int. Cl.
*G06T 7/593* (2017.01)
*G06T 7/13* (2017.01)
(Continued)

(52) U.S. Cl.
CPC ................ *G06T 7/593* (2017.01); *G06T 7/13* (2017.01); *G06T 7/60* (2013.01); *G06T 7/70* (2017.01);
(Continued)

(58) Field of Classification Search
CPC ......... G06T 11/203; G06T 2207/10012; G06T 2207/20101; G06T 7/13; G06T 7/593; G06T 7/60; G06T 7/70; G06K 2209/057; G06K 9/62; G06K 9/6223
See application file for complete search history.

(56) References Cited

U.S. PATENT DOCUMENTS

2013/0294681 A1 11/2013 Nishimura et al.

FOREIGN PATENT DOCUMENTS

| JP | 2003269917 A | 9/2003 |
| JP | 2010016580 A | 1/2010 |

(Continued)

OTHER PUBLICATIONS

English translation of the International Preliminary Report on Patentability (IPRP) dated Nov. 20, 2018 issued in International Application No. PCT/JP2016/064461.

(Continued)

*Primary Examiner* — Michelle L Sams
(74) *Attorney, Agent, or Firm* — Holtz, Holtz & Volek PC

(57) ABSTRACT

An image processing apparatus includes at least one circuit. The at least one circuit acquires a plurality of images, including at least a first image and a second image obtained by photographing a subject from different viewpoints, acquires an instruction from a user, sets on the first image a measurement point for which three-dimensional coordinates of the subject are required, based on the instruction, calculates a correspondence point which is on the second image and which corresponds to the measurement point, by matching, calculates a reliability of the matching between the measurement point and the correspondence point as a measurement point reliability, and sets on the first image an alternative measurement point enabling a reliability higher than that of the measurement point reliability, instead of the measurement point, if the measurement point reliability is less than a predetermined threshold value.

10 Claims, 13 Drawing Sheets

(51) Int. Cl.
    *G06T 7/70*     (2017.01)
    *G06T 7/60*     (2017.01)
    *G06T 11/20*    (2006.01)
    *G06K 9/62*     (2006.01)
(52) U.S. Cl.
    CPC .......... *G06T 11/203* (2013.01); *G06K 9/6202* (2013.01); *G06K 9/6223* (2013.01); *G06K 2209/057* (2013.01); *G06T 2207/10012* (2013.01); *G06T 2207/20101* (2013.01)

(56) References Cited

FOREIGN PATENT DOCUMENTS

| JP | 2013242854 A | * | 12/2013 | ........... H04N 13/128 |
| JP | 2013242854 A | | 12/2013 | |
| JP | 2014147572 A | * | 8/2014 | |
| JP | 2014147572 A | | 8/2014 | |

OTHER PUBLICATIONS

English translation of the International Preliminary Report on Patentability (IPRP) dated Nov. 20, 2018 in International Application No. PCT/JP2017/016208.
International Search Report (ISR) dated Jul. 11, 2017 issued in International Application No. PCT/JP2017/016208.
Written Opinion dated Jul. 11, 2017 issued in International Application No. PCT/JP2017/016208.

* cited by examiner

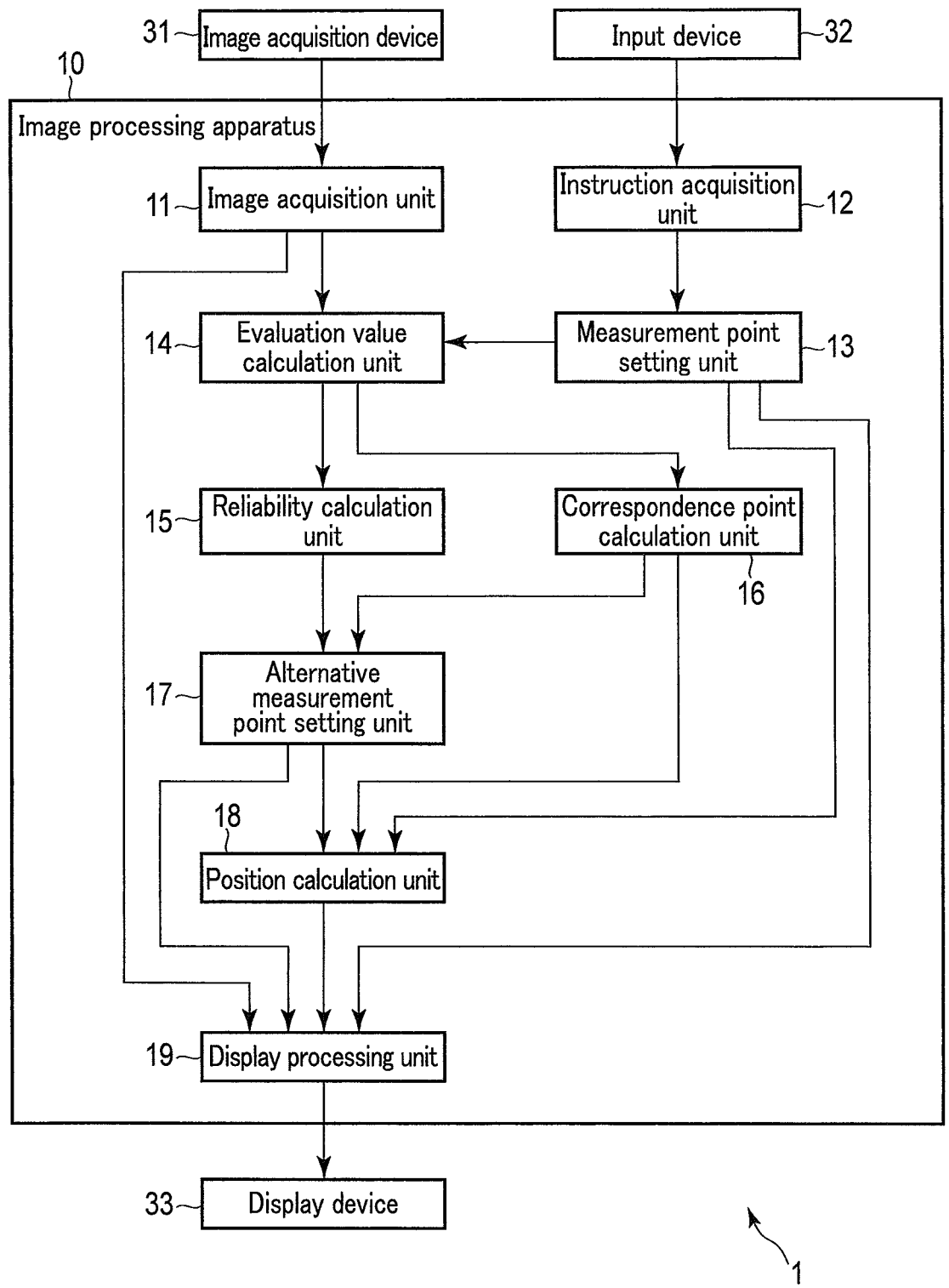
F I G. 1

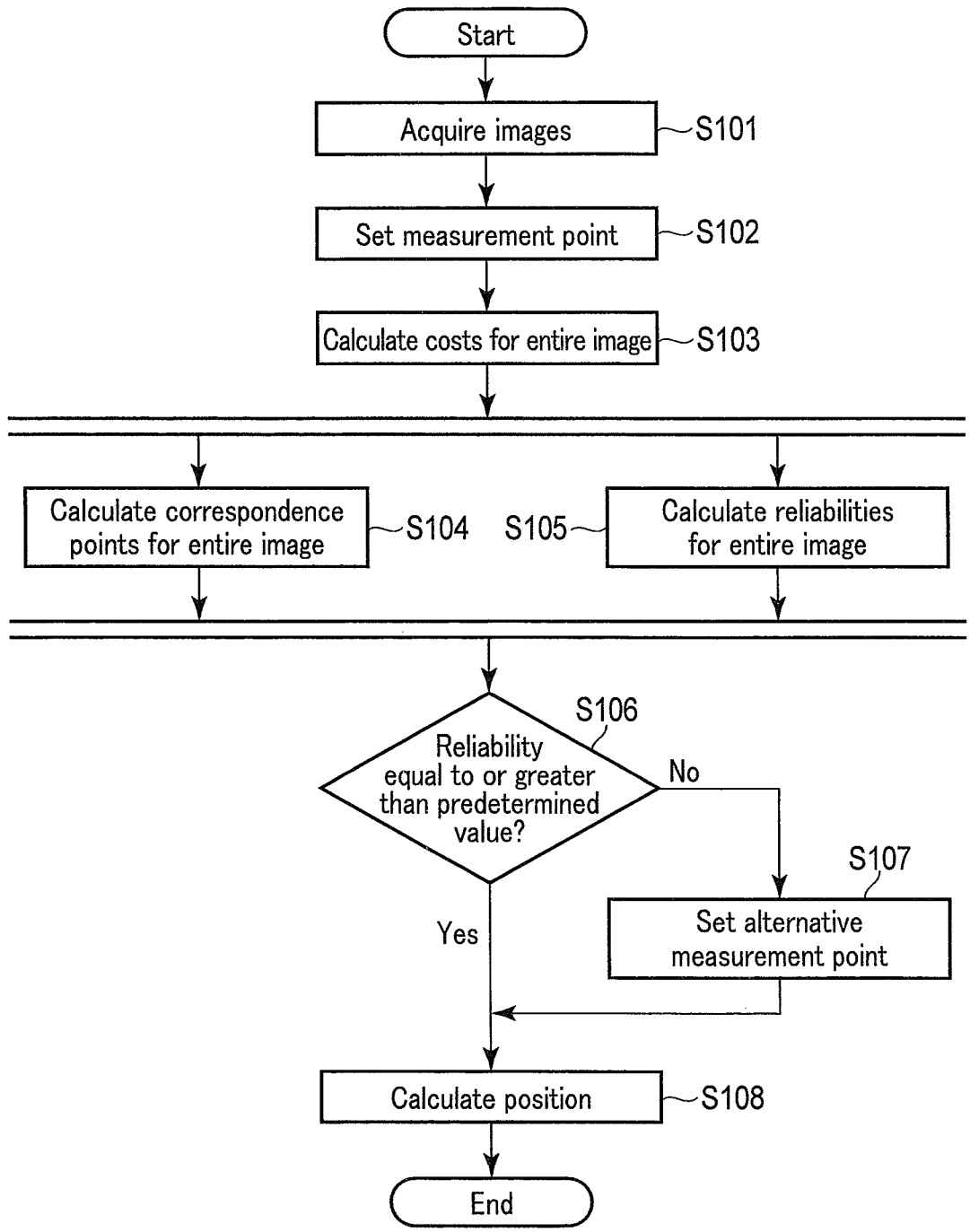
F I G. 3

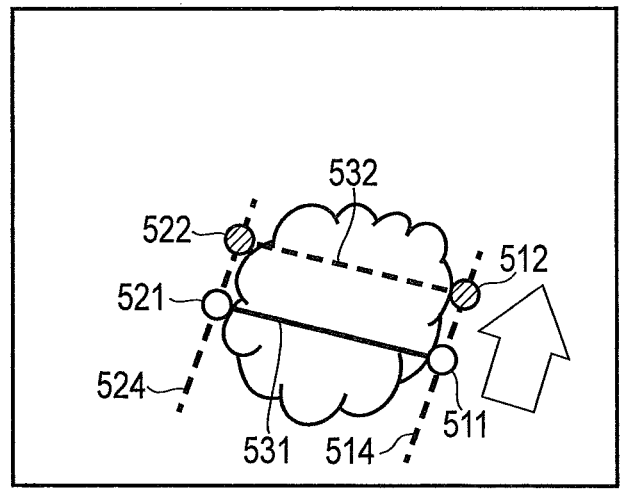
F I G. 11
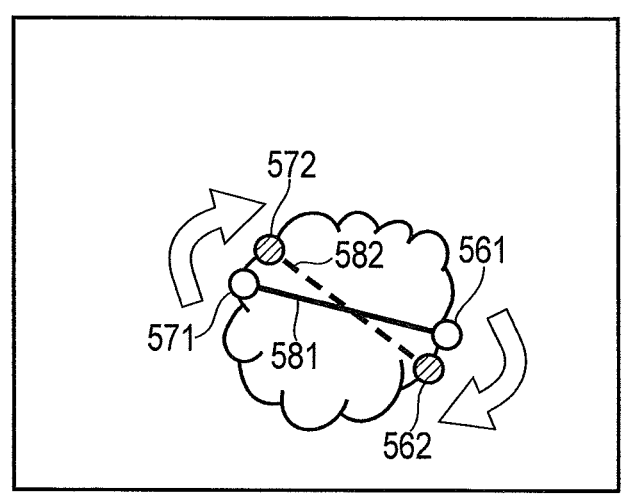
F I G. 12

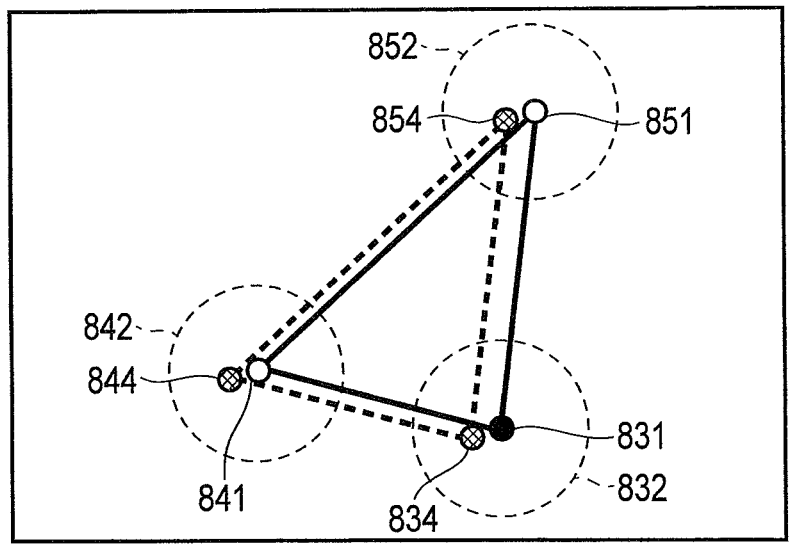
F I G. 17
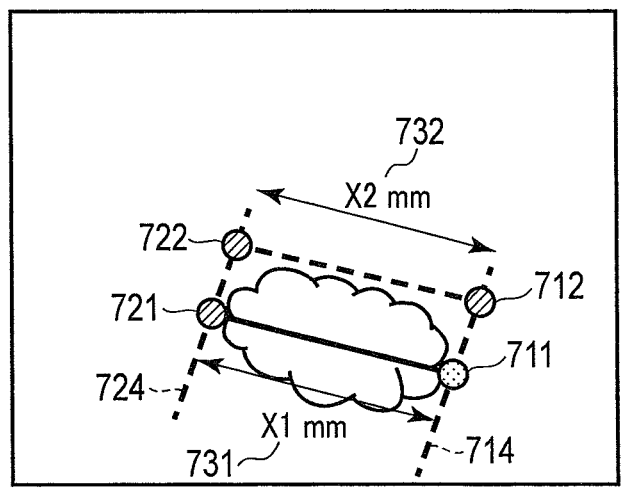
F I G. 18

IMAGE PROCESSING APPARATUS AND IMAGE PROCESSING METHOD FOR SETTING MEASURING POINT TO CALCULATE THREE-DIMENSIONAL COORDINATES OF SUBJECT IMAGE WITH HIGH RELIABILITY

CROSS-REFERENCE TO RELATED APPLICATION

This application is a Continuation Application of PCT Application No. PCT/JP2017/016208, filed Apr. 24, 2017 and based upon and claiming the benefit of priority from the prior PCT Application No. PCT/JP2016/064461, filed May 16, 2016, the entire contents of which are incorporated herein by reference.

BACKGROUND OF THE INVENTION

1. Field of the Invention

The present invention relates to an image processing apparatus and an image processing method.

2. Description of the Related Art

In general, there is known a technique which obtains three-dimensional coordinates of a subject by the principle of triangulation based on positional deviations of those images obtained from different viewpoints. For example, Jpn. Pat. Appln. KOKAI Publication No. 2014-147572 discloses a technique for measuring the size of a subject based on two images of the same subject. In this technique, the following is performed. Where one of the two images is set as a first image and the other is set as a second image, a measurement point is set on the first image by the user. A plurality of candidates of a correspondence point which is on the second image and corresponds to the measurement point are calculated using a plurality of matching methods. Furthermore, matching reliability is calculated with respect to the candidates of the correspondence point. If the reliability is less than a predetermined value, the candidates of the correspondence point are presented to the user. When a correspondence point is selected by the user, three-dimensional coordinates of the point corresponding to the measurement point on the subject are calculated using the selected correspondence point. By performing above-mentioned calculation of three-dimensional coordinates with respect to two or more points, the size of the subject is calculated. In the technique described above, the accuracy of the calculated size of the subject can be improved by using correspondence points whose reliabilities are high.

BRIEF SUMMARY OF THE INVENTION

According to a first aspect of the present invention, there is provided an image processing apparatus comprising at least one circuit configured to: acquire a plurality of images, including at least a first image and a second image obtained by photographing a subject from different viewpoints; acquire an instruction from a user; set on the first image a measurement point for which three-dimensional coordinates of the subject are required, based on the instruction; calculate a correspondence point which is on the second image and which corresponds to the measurement point, by matching; calculate a reliability of the matching between the measurement point and the correspondence point as a measurement point reliability; and set on the first image an alternative measurement point enabling a reliability higher than that of the measurement point reliability, instead of the measurement point, if the measurement point reliability is less than a predetermined threshold value.

According to a second aspect of the present invention, there is provided an image processing method comprising: acquiring a plurality of images, including at least a first image and a second image obtained by photographing a subject from different viewpoints; acquiring an instruction from a user; setting on the first image a measurement point for which three-dimensional coordinates of the subject are required, based on the instruction; calculating a correspondence point which is on the second image and which corresponds to the measurement point, by matching; calculating a reliability of the matching between the measurement point and the correspondence point as a measurement point reliability; and setting on the first image an alternative measurement point enabling a reliability higher than the measurement point reliability, instead of the measurement point, if the measurement point reliability is less than a predetermined threshold value.

According to a third aspect of the present invention, there is provided a storage medium, which non-transitory stores a computer-readable image processing program, causing a computer to: acquire a plurality of images, including at least a first image and a second image obtained by photographing a subject from different viewpoints; acquire an instruction from a user; set on the first image a measurement point for which three-dimensional coordinates of the subject are required, based on the instruction; calculate a correspondence point which is on the second image and which corresponds to the measurement point, by matching; calculate a reliability of the matching between the measurement point and the correspondence point as a measurement point reliability; and set on the first image an alternative measurement point enabling a reliability higher than the measurement point reliability, instead of the measurement point, if the measurement point reliability is less than a predetermined threshold value.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing a configuration example of an image processing system according to a first embodiment.

FIG. 3 is a flowchart schematically showing an example of an operation performed by the image processing apparatus according to the first embodiment.

FIG. 11 is a diagram illustrating an example of how alternative measurement points are set according to a second embodiment.

FIG. 12 is a diagram illustrating an example of how alternative measurement points are set according to the second embodiment.

FIG. 17 is a diagram illustrating an example of how alternative measurement points are set according to the second embodiment where priority is given to proximity between measurement points and alternative measurement points.

FIG. 18 is a diagram schematically showing an example of what is displayed on a display device.

DETAILED DESCRIPTION OF THE INVENTION

First Embodiment

[Outline of Image Processing System]

Figure 2:
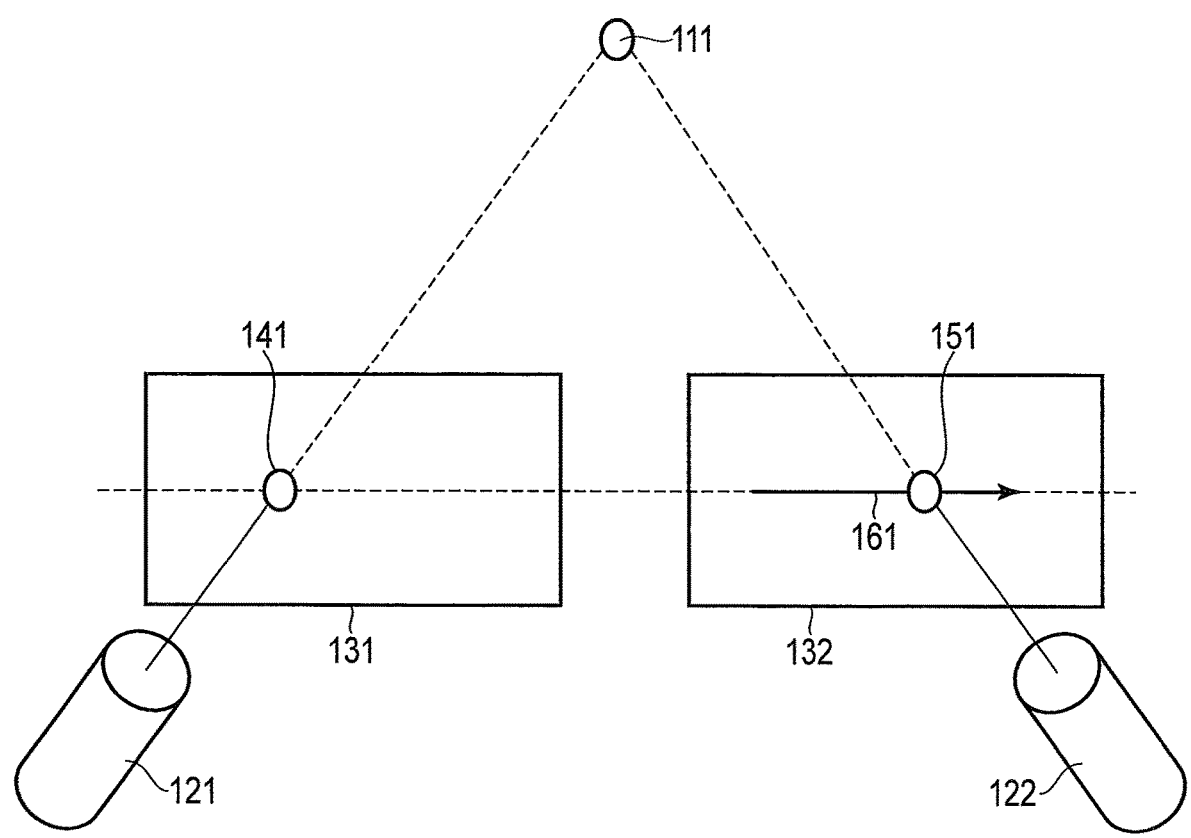
FIG. 2 is a diagram illustrating a method of calculating a position in a three-dimensional space.

The image processing system according to the first embodiment calculates three-dimensional coordinates of a subject based on two images having a parallax. The image processing system includes an image processing apparatus. The image processing apparatus acquires a first image and a second image which have a parallax. Further, the image processing apparatus acquires the position of a measurement point as an instruction from the user. For example, the position of the measurement point is a point for which three-dimensional coordinates in the first image are to be calculated. The image processing apparatus calculates a correspondence point which is a point on the second image and corresponds to the measurement point. The image processing apparatus calculates reliability of the correspondence relationship between the measurement point and the correspondence point. Where the reliability is equal to or greater than the predetermined value, the image processing apparatus calculates three-dimensional coordinates of the subject based on the measurement point and the correspondence point. When the reliability is less than the predetermined value, the image processing apparatus calculates a point, which is near the measurement point and which provides high reliability is calculated, as an alternative measurement point. Then, the image processing apparatus calculates three-dimensional coordinates of the subject based on the alternative measurement point and its correspondence point.

<Configuration of Image Processing System>

A description will now be given of an image processing system according to the first embodiment with reference to the accompanying drawings. FIG. 1 schematically shows a configuration example of the image processing system 1 according to the first embodiment. As shown in FIG. 1, the image processing system 1 is provided with an image processing apparatus 10, an image acquisition device 31, an input device 32 and a display device 33.

The image acquisition device 31 is, for example, an imaging device including two pairs of imaging optical systems and imaging devices and capable of photographing the same subject from different directions. That is, the image acquisition device 31 includes a so-called stereo camera. The image acquisition device 31 may be, for example, a stereo endoscope system in which a stereo camera is provided at the distal end portion of an endoscope. The image acquisition device 31 generates a plurality of images such as so-called right and left images having a parallax. In other words, the image acquisition device 31 photographs the subject from different viewpoints and generates a plurality of images including a first image and a second image.

The input device 32 includes such input devices as a mouse, a touch panel, and a keyboard. The display device 33 includes such a display device as a liquid crystal display.

The image processing apparatus 10 includes a computer, such as a personal computer incorporating a processor. The image processing apparatus 10 may be provided integrally with the input device 32 or the display device 33.

The image processing apparatus 10 is provided with functions serving as an image acquisition unit 11, an instruction acquisition unit 12, a measurement point setting unit 13, an evaluation value calculation unit 14, a reliability calculation unit 15, a correspondence point calculation unit 16, an alternative measurement point setting unit 17, a position calculation unit 18, and a display processing unit 19.

The image acquisition unit 11 acquires image data from the outside of the image processing apparatus 10. For example, the image acquisition unit 11 acquires an image from the image acquisition device 31. It should be noted here that the image acquisition unit 11 acquires a plurality of images obtained by photographing a subject from different viewpoints and including a first image and a second image.

The image acquisition unit 11 may further perform parallelization conversion processing. The parallelization conversion processing may include a process for removing distortion attributable to the optical system of the image acquisition device 31. The parallelization conversion processing may include a process of making epipolar lines parallel to the first and second images in order to obtain a correspondence relationship between the first image and the second image, which will be described later.

The instruction acquisition unit 12 acquires an instruction entered by the user. For example, the instruction acquisition unit 12 obtains a user's instruction from the input device 32. In the present embodiment, the image processing apparatus 10 causes the display device 33 to display at least one of the images acquired by the image acquisition unit 11. The user enters a measurement point on the displayed image by using the input device 32. The measurement point is a point for which three-dimensional coordinates of the subject are required. The instruction acquisition unit 12 acquires information on the position of the measurement point designated by the user, from the input device 32.

The measurement point setting unit 13 acquires information on the position of the measurement point entered by the user, from the instruction acquisition unit 12. The measurement point setting unit 13 sets the coordinates of the measurement point on the image, based on the acquired information. The coordinates of this measurement point are set as a point on the first image acquired by the image acquisition unit 11.

The evaluation value calculation unit 14 acquires the first image and the second image from the image acquisition unit 11. The evaluation value calculation unit 14 calculates an evaluation value for obtaining the correspondence relationship between the first image and the second image. In order to evaluate the correspondence relationship between the first image and the second image, for example, a technique for template matching processing can be used. In this processing, a matching evaluation index, such as Sum of Squared Difference (SAD), Zero-mean Normalized Cross Correlation (ZNCC) or the like can be used. The SAD is an index representing a difference or a cost with a template. The smaller the value of the SAD is, the higher is the degree of coincidence. The ZNCC is an index representing a correlation or a similarity with a template. The larger the value of the ZNCC is, the higher is the degree of coincidence. In the present embodiment, a cost, a smaller value of which indicates a higher degree of matching, is used as the matching index. However, the matching index is not limited to the cost, and various evaluation values can be used.

The reliability calculation unit 15 calculates the reliability of matching between a point on the first image and a point on the second image as measurement point reliability. That is, matching is performed for each point on the first image, i.e., a reference image, and the reliability of the matching is calculated as a scalar value.

The correspondence point calculation unit 16 calculates, by matching, a correspondence point on the second image where is point corresponding to the measurement point set on the first image. In the template matching process, the correspondence point calculation unit 16 obtains costs while shifting the position of the template for the measurement point and calculates a point corresponding to the smallest cost as a correspondence point, based on the obtained costs. In a similar manner, the correspondence point calculation unit 16 calculates, by matching, a correspondence point on the second image corresponding to an alternative measurement point described later. In order to obtain these correspondence points, the correspondence point calculation unit 16 of the present embodiment calculates which point on the second image corresponds to each point on the first image.

The alternative measurement point setting unit 17 acquires reliability information from the reliability calculation unit 15, and determines whether the measurement point reliability is equal to or greater than a predetermined threshold value. If the measurement point reliability is less than the predetermined threshold value, the alternative measurement point setting unit 17 sets, in place of the measurement point, an alternative measurement point on the first image. The alternative measurement point is a point where provides a higher reliability than that of the measurement point.

The position calculation unit 18 calculates three-dimensional coordinates of the subject in accordance with the measurement point or the alternative measurement point, based on: the photographing condition such as the photographing direction of the image acquisition device 31; the measurement point acquired from the measurement point setting unit 13 or alternative measurement point acquired from the alternative measurement point setting unit 17; and the correspondence point acquired from the correspondence point calculation unit 16.

The display processing unit 19 creates an image to be displayed on the display device 33 and controls display of the display device 33. The display device 33 displays, for example, an image acquired by the image acquisition unit 11, the position of the measurement point or alternative measurement point used for the coordinate calculation, and three-dimensional coordinates calculated by the position calculation unit 18.

The image acquisition unit 11, the instruction acquisition unit 12, the measurement point setting unit 13, the evaluation value calculation unit 14, the reliability calculation unit 15, the correspondence point calculation unit 16, the alternative measurement point setting unit 17, the position calculation unit 18, and the display processing unit 19, which are elements of the image processing apparatus 10, may include such an integrated circuit as a Central Processing Unit (CPU), an Application Specific Integrated Circuit (ASIC), or a Field Programmable Gate Array (FPGA). Each of these units may be one integrated circuit or the like, or may be a combination of a plurality of integrated circuits or the like. In addition, two or more of the units may be made of one integrated circuit or the like. The operations of these integrated circuits are performed in accordance with a program recorded in a storage device or a storage area (not shown) provided in the image processing apparatus 10.

<Position Calculation Method>

A method of how a position in three-dimensional space is calculated based on two images will be described with reference to FIG. 2. Consideration will be given as to how three-dimensional coordinates of the subject 111 are obtained. The image acquisition device 31 includes a left camera 121 and a right camera 122. The left camera 121 and the right camera 122 capture images of the subject 111. The images obtained by this image capturing will be referred to as a left image 131 and a right image 132. For example, the left image 131 corresponds to a first image, and the right image 132 corresponds to a second image.

In the left image 131, the position of the subject 111 is set as the position of a measurement point 141. In this case, on the right image 132, a correspondence point 151 corresponding to the measurement point 141 is searched for. This search is performed on a straight line along the epipolar line, as indicated by the arrow 161 on the right image 132. For example, where the epipolar line is adjusted to be horizontal the image by the parallelization processing, the correspondence point 151 can be found by performing a search in the right and left direction from the point corresponding to the measurement point 141.

The coordinates of the subject 111 in the three-dimensional space are obtained according to the principle of triangulation, based on how the positional relationship between the left camera 121 and the right camera 122 is when the images are captured, and on where the measurement point 141 and the correspondence point 151 are.

It is to be noted that the measurement point may be set on either of the right image or the left image, and the correspondence point is specified on the other image.

<Operation of Image Processing Apparatus>

An operation of the image processing apparatus 10 according to the first embodiment will be described with reference to the flowchart shown in FIG. 3.

In step S101, the image acquisition unit 11 of the image processing apparatus 10 acquires a first image and a second image from the image acquisition device 31. The image acquisition unit 11 transmits the acquired images to the evaluation value calculation unit 14 and the display processing unit 19.

In step S102, the measurement point setting unit 13 of the image processing apparatus 10 sets a measurement point as coordinates on an image, based on the user's instruction acquired by the instruction acquisition unit 12. The measurement point setting unit 13 transmits the information on the coordinates of the set measurement point to the evaluation value calculation unit 14, the position calculation unit 18, and the display processing unit 19.

Figure 4:
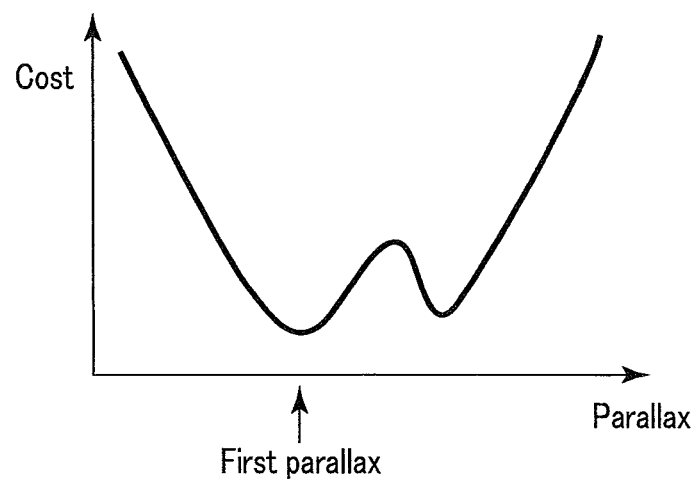
FIG. 4 is a diagram schematically showing an example of a cost waveform which is calculated by a cost calculation unit and which shows how a parallax and a cost are related.

In step S103, the evaluation value calculation unit 14 of the image processing apparatus 10 calculates a cost, which is one of evaluation values, for each of the points on the entire first image. FIG. 4 schematically shows an example of a cost waveform calculated for a given point. The calculated cost indicates a difference between a point of interest on the first image and each point on the second image. In FIG. 4, the abscissa axis shows the positional difference between the coordinates of the point of interest on the first image and points on the second image for which the cost is calculated, that is, the parallax, and the ordinate axis shows how the cost is with reference to the parallax. Based on the calculated cost, the calculation of the reliability and the calculation of the correspondence point, which are to be described later, are performed. The evaluation value calculation unit 14 transmits the calculated cost to the reliability calculation unit 15 and the correspondence point calculation unit 16.

The processing in step S104 and the processing in step S105 are performed in parallel. In step S104, the correspondence point calculation unit 16 of the image processing apparatus 10 calculates correspondence points for the entire image. That is, the correspondence point calculation unit 16 determines a correspondence point on the second image based on the cost calculated in step S103, for each of points on the first image. In the example shown in FIG. 4, the cost is minimal at the first parallax indicated by the arrow. The correspondence point calculation unit 16 determines such a cost-minimal point as a correspondence point. Where similarity is used as an evaluation value, the point at which the similarity is maximal is determined as the correspondence point. The correspondence point calculation unit 16 transmits the calculated correspondence points to the alternative measurement point setting unit 17 and the position calculation unit 18.

In step S105, the reliability calculation unit 15 of the image processing apparatus 10 calculates reliabilities for the entire image. That is, the reliability calculation unit 15 calculates the reliability for determination of the correspondence point based on the cost calculated in step S103, for each of the points on the first image. Since the determination of the correspondence point is a process of specifying a minimum value of the cost waveform, the reliability can be obtained by utilizing the steepness of the cost waveform or the extreme values of the cost. A technique for obtaining the reliability based the steepness of the cost waveform is disclosed, for example, in Jpn. Pat. Appln. KOKAI Publication No. 2003-269917 of which the entire contents are incorporated herein by reference. A technique for obtaining the reliability using the extreme values of the cost is disclosed, for example, in Jpn. Pat. Appln. KOKAI Publication No. 2010-16580 of which the entire contents are incorporated herein by reference. The reliability may be determined based on the features of an image. For example, where the edge intensity of an image is high, such an image portion can be regarded as a high-reliability portion. Further, a portion having a high contrast in a region of interest can be regarded as having high reliability. The reliability calculation unit 15 transmits the calculated reliabilities to the alternative measurement point setting unit 17.

After step S104 and step S105, the processing proceeds to step S106. In step S106, the alternative measurement point setting unit 17 of the image processing apparatus 10 determines whether the reliability calculated in step S105 is equal to or greater than a predetermined threshold value, with respect to the measurement point set in step S102. If the reliability is equal to or greater than the predetermined threshold value, the processing proceeds to step S108. On the other hand, if the reliability is less than the predetermined threshold value, the processing proceeds to step S107. For example, if the measurement point is inside a region where there are blown out highlights, a region where there is no texture, a region where occlusion occurs, or the like, the reliability may be less than the predetermined threshold value.

In step S107, the alternative measurement point setting unit 17 of the image processing apparatus 10 sets an alternative measurement point. The alternative measurement point is a point where three-dimensional coordinates are can be obtained in place of the measurement point and where reliability higher than that of the measurement point can be obtained.

Figure 5:
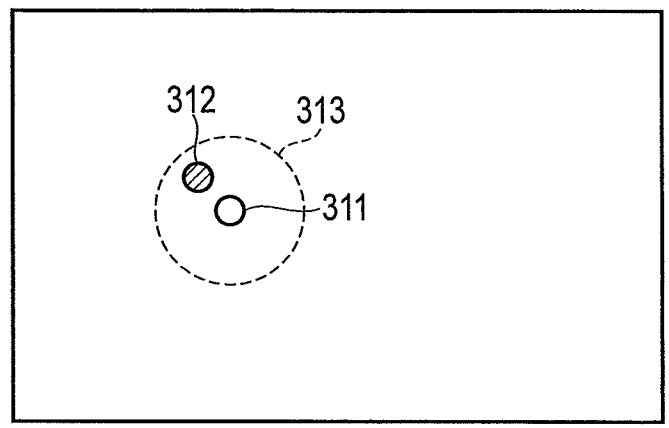
FIG. 5 is a diagram illustrating an example of a setting method of setting an alternative measurement point.

The setting of an alternative measurement point will be described with reference to FIG. 5. In FIG. 5, consideration will be given to the case where the reliability of the measurement point 311 is low. At this time, a circle whose center is the measurement point 311 and whose radius has a predetermined length is set as a neighboring region 313. The alternative measurement point setting unit 17 searches the neighboring region 313 for a point at which the reliability becomes highest, and sets that point as an alternative measurement point 312.

Figure 6:
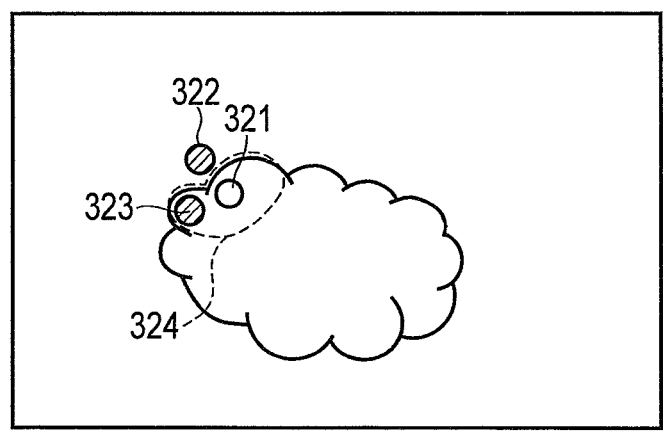
FIG. 6 is a diagram illustrating another example of a setting method of setting an alternative measurement point.

On the image shown in FIG. 6, the alternative measurement point setting unit 17 may set a neighboring region 324 based on the edge of an image. In this case, the alternative measurement point setting unit 17 sets a point which is within the neighboring region 324 and at which the reliability is maximal, as the alternative measurement point 323. Even if a point 322 having a high reliability exists at a position closer to the measurement point than the predetermined distance, that point 322 is not within the neighboring region 324. Therefore, the alternative measurement point setting unit 17 sets a point inside the neighboring region 324 as the alternative measurement point 323 even if the reliability of this point is lower than that of point 322. The outside of the neighboring region 324 set based on the edge of an image or the like may represent a subject different from that represented by the inside of the neighboring region 324. Therefore, if a point outside the neighboring region 324 is set as the alternative measurement point, three-dimensional coordinates of a subject different from the subject of interest may be obtained. Where the neighboring region 324 is set based on the edge of the image or the like, an alternative measurement point is set on the subject of interest, and three-dimensional coordinates of the subject of interest are obtained. The neighboring region 324 is, for example, a region that is set along a detected edge, a region that does not overlap an edge, a region where the contrast difference from the measurement point is within a predetermined value, or a region where the color difference from the measurement point is within a predetermined value. Such a region can be set using, for example, a K-means method, a region growing method, or a Snake algorithm.

The alternative measurement point setting unit 17 transmits the set alternative measurement point to the position calculation unit 18 and the display processing unit 19. After the alternative measurement point is set in step S107, the processing proceeds to step S108.

In step S108, the position calculation unit 18 of the image processing apparatus 10 calculates three-dimensional coordinates of the subject corresponding to the measurement point or the alternative measurement point, based on the measurement point or alternative measurement point and on the correspondence point corresponding to that point. The calculation of three-dimensional coordinates is performed based on the principle of triangulation described with reference to FIG. 2, for example. The position calculation unit 18 transmits the calculated three-dimensional coordinates to the display processing unit 19. Thereafter, the display processing unit 19 of the image processing apparatus 10 causes the display device 33 to display the first image acquired by the image acquisition unit 11, the position of the measurement point or alternative measurement point used for calculating the three-dimensional coordinates, the calculated three-dimensional coordinates, etc. The second image may also be displayed on the display device 33. In this case, the position of the correspondence point may be displayed on the second image. Thereafter, the processing is ended.

In connection with the present embodiment, reference was made to the case where the image acquisition unit 11 acquires an image from the image acquisition device 31 including an image capturing device, but this is not restrictive. The image acquisition unit 11 may acquire images from a storage device or the like. In connection with the present embodiment, reference was made to the case where two images are used for calculating three-dimensional coordinates, but the images used are at least two and three or more images may be used. In the above-mentioned example, the processing in step S104 and the processing in step S105 are performed in parallel, but these may be performed in order. In this case, either processing may be performed first.

<Features of Image Processing Apparatus>

The image processing apparatus 10 according to the present embodiment has the following advantages. If the user selects a measurement point inside a region where there are blown out highlights or a region where there is no texture, the reliability of calculation of the correspondence point corresponding to the measurement point is low. As a result, the reliability of the three-dimensional coordinates calculated with respect to the measurement point and the calculated correspondence point also becomes low. In such a case, according to the present embodiment, an alternate measurement point having high reliability is set near a measurement point. Three-dimensional coordinates of the alternative measurement point are calculated based on the set alternative measurement point and a correspondence point corresponding to the alternative measurement point. Therefore, three-dimensional coordinates of the alternative measurement point set in the vicinity of the measurement point designated by the user are accurately calculated. Since the alternative measurement point is a point near the measurement point designated by the user, the three-dimensional coordinates of the two points are not exactly the same, but this difference is considered negligible. In addition, since the alternative measurement point is selected by the image processing apparatus 10 based on the reliability, the user does not have to bother to select a measurement point again. As described above, the image processing apparatus 10 according to the present embodiment is advantageous in that three-dimensional coordinates can be calculated with high accuracy with less burden on the user.

First Modification of First Embodiment

Figure 7:
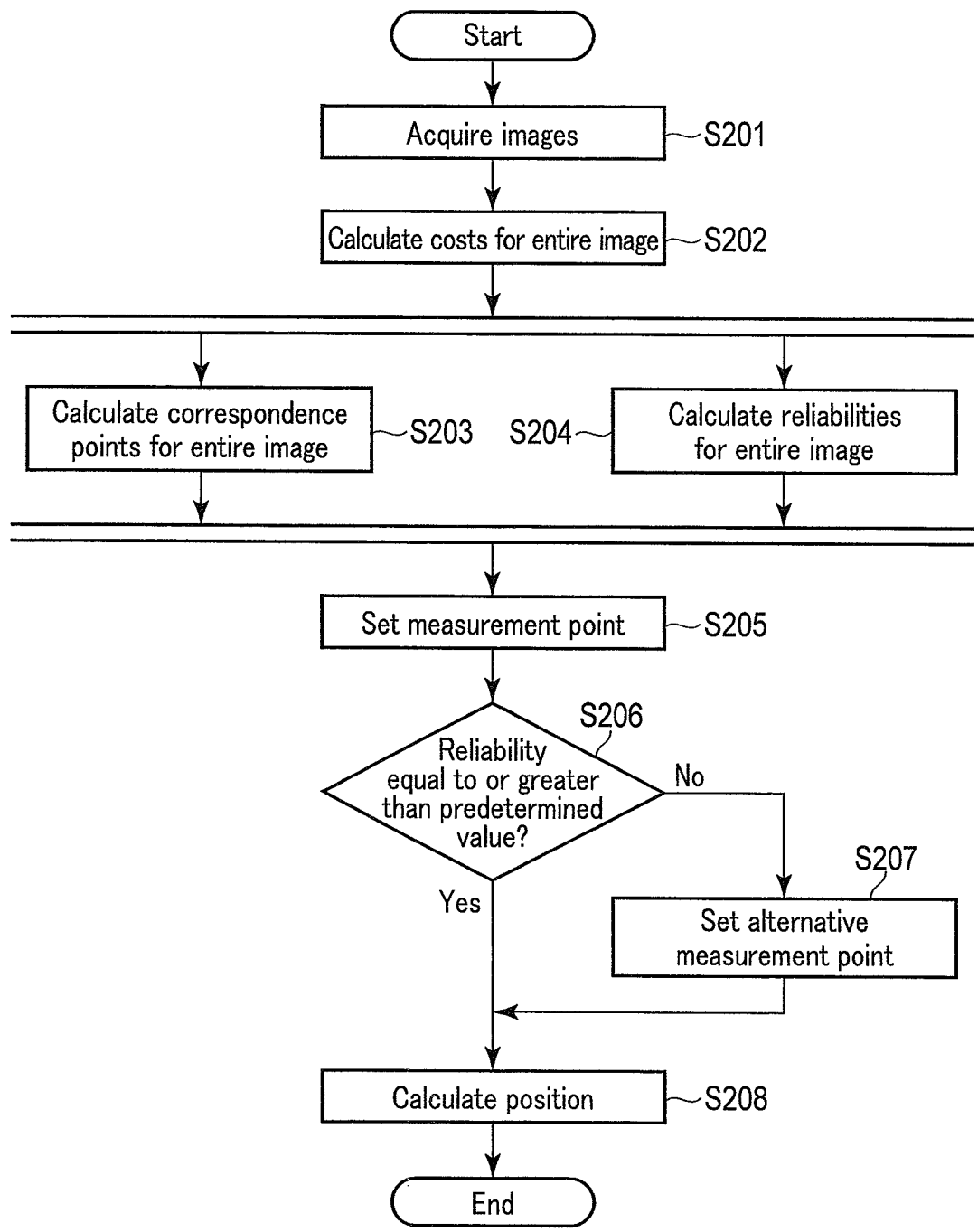
FIG. 7 is a flowchart schematically showing an example of an operation performed by an image processing apparatus according to a first modification of the first embodiment.

The first modification of the first embodiment of the present invention will be described. In the description below, reference will be made to how the first modification differs from the first embodiment. Therefore, the same symbols will be used to denote structural elements similar or corresponding to those of the first embodiment, and a description of such structural elements will be omitted. The present modification differs from the first embodiment in the order of processing. More specifically, the timing of setting a measurement point is different from that of the first embodiment. An operation of the image processing apparatus 10 according to the first modification of the first embodiment will be described with reference to the flowchart shown in FIG. 7.

In step S201, the image acquisition unit 11 acquires a first image and a second image. In step S202, the evaluation value calculation unit 14 calculates costs for the entire image as an evaluation value.

The processing in step S203 and the processing in S204 are performed in parallel. In step S203, the correspondence point calculation unit 16 calculates a correspondence point for each of the points on the entire first image. In step S204, the reliability calculation unit 15 calculates reliability for each of the points on the entire first image.

After the processing in step S203 and the processing in S204, step S205 is executed in which the measurement point Setting unit 13 acquires from the instruction acquisition unit 12 an instruction related to a measurement point the user enters, and sets the measurement point.

In step S206, the alternative measurement point setting unit 17 determines whether the reliability of the set measurement point is equal to or greater than a predetermined threshold value. If the reliability is equal to or greater than the predetermined threshold value, the processing proceeds to step S208. On the other hand, if the reliability is less than the predetermined threshold value, the processing proceeds to step S207. In step S207, the alternative measurement point setting unit 17 sets an alternative measurement point in the vicinity of the measurement point. Subsequently, the processing proceeds to step S208.

In step S208, the position calculation unit 18 calculates three-dimensional coordinates, based on the measurement point or alternative measurement point and on the correspondence point corresponding to that point. Subsequently, the display processing unit 19 causes the display device 33 to display necessary information.

Since the calculation of a correspondence points and the calculation of reliabilities are performed with respect to the entire image, the setting of a measurement point may be performed after calculation of the correspondence points and reliabilities, as in this modification. According to this modification as well, the same advantages as described above can be obtained.

Second Modification of First Embodiment

Figure 8:
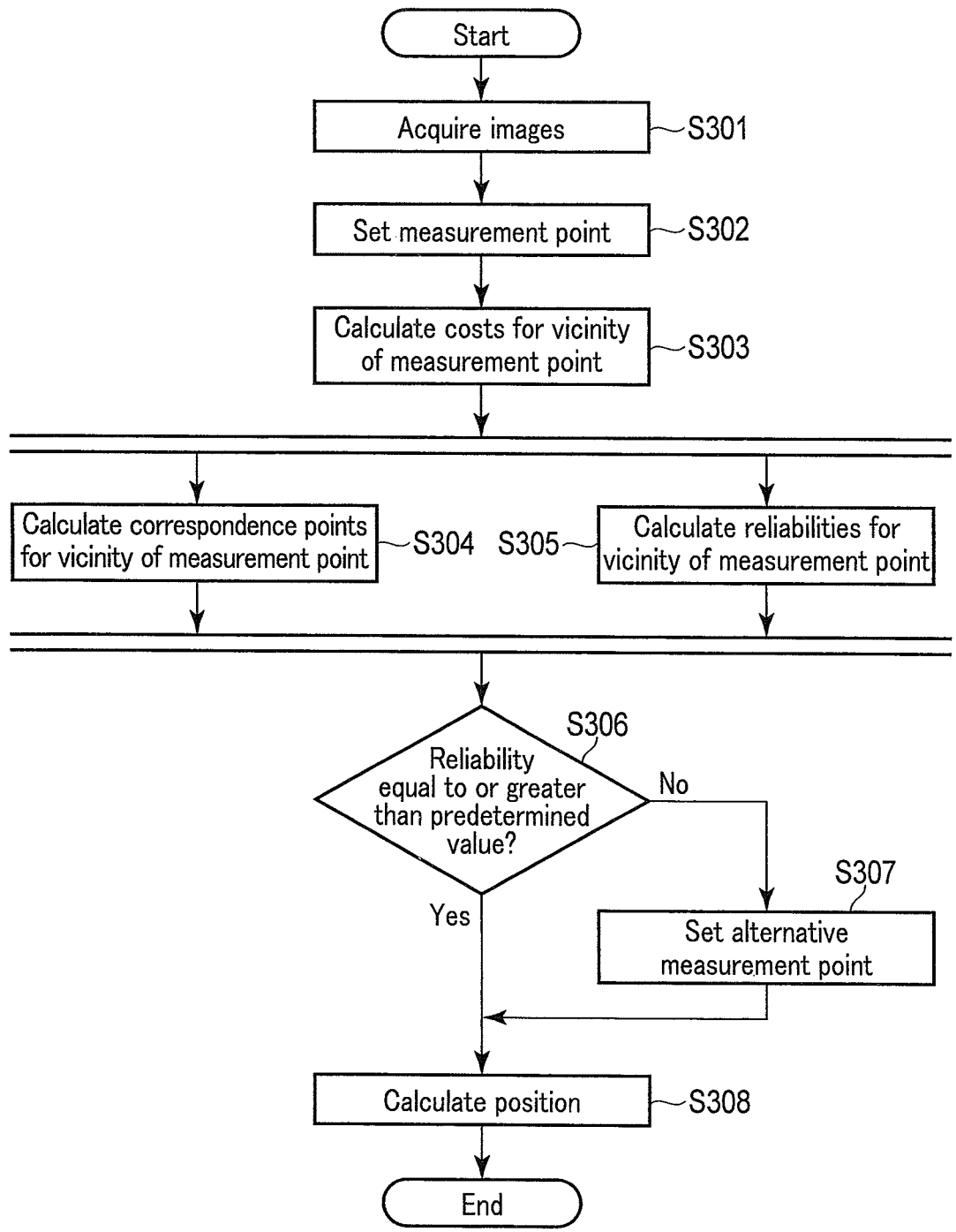
FIG. 8 is a flowchart schematically showing an example of an operation performed by an image processing apparatus according to a second modification of the first embodiment.

The second modification of the first embodiment of the present invention will be described. In the description below, reference will be made to how the second modification differs from the first embodiment. Therefore, the same symbols will be used to denote structural elements similar or corresponding to those of the first embodiment, and a description of such structural elements will be omitted. In the present modification, costs are calculated only for points near the measurement point, and the correspondence points and reliabilities are calculated. An operation of the image processing apparatus 10 according to the second modification of the first embodiment will be described with reference to the flowchart shown in FIG. 8.

In step S301, the image acquisition unit 11 acquires a first image and a second image. In step S302, the measurement point setting unit 13 acquires from the instruction acquisition unit 12 an instruction related to a measurement point the user enters, and sets the measurement point. In step S303, the evaluation value calculation unit 14 calculates costs as an evaluation value only for a measurement point set in step S302 and the vicinity thereof.

The processing in step S304 and the processing in S305 are performed in parallel. In step S304, the correspondence point calculation unit 16 calculates correspondence points for the measurement point on the first image and for each of the points in the vicinity of the measurement point. In step S305, the reliability calculation unit 15 calculates reliabilities for the measurement point on the first image and for each of the points in the vicinity of the measurement point. After step S304 and step S305, the processing proceeds to step S306.

In step S306, the alternative measurement point setting unit 17 determines whether the reliability of the set measurement point is equal to or greater than a predetermined threshold value. If the reliability is equal to or greater than the predetermined threshold value, the processing proceeds to step S308. On the other hand, if the reliability is less than the predetermined threshold value, the processing proceeds to step S307. In step S307, the alternative measurement point setting unit 17 sets an alternative measurement point in the vicinity of the measurement point. Subsequently, the processing advances to step S308.

In step S308, the position calculation unit 18 calculates three-dimensional coordinates, based on the measurement point or alternative measurement point and on the correspondence point corresponding to that point. Subsequently, the display processing unit 19 causes the display device 33 to display necessary information.

According to the present modification, the costs, the correspondence points and the reliabilities are calculated only for the vicinity of the measurement point. As a result, the calculation amount can be reduced and the calculation time can be shortened. According to this modification as well, the same advantages as described above can be obtained.

Third Modification of First Embodiment

Figure 9:
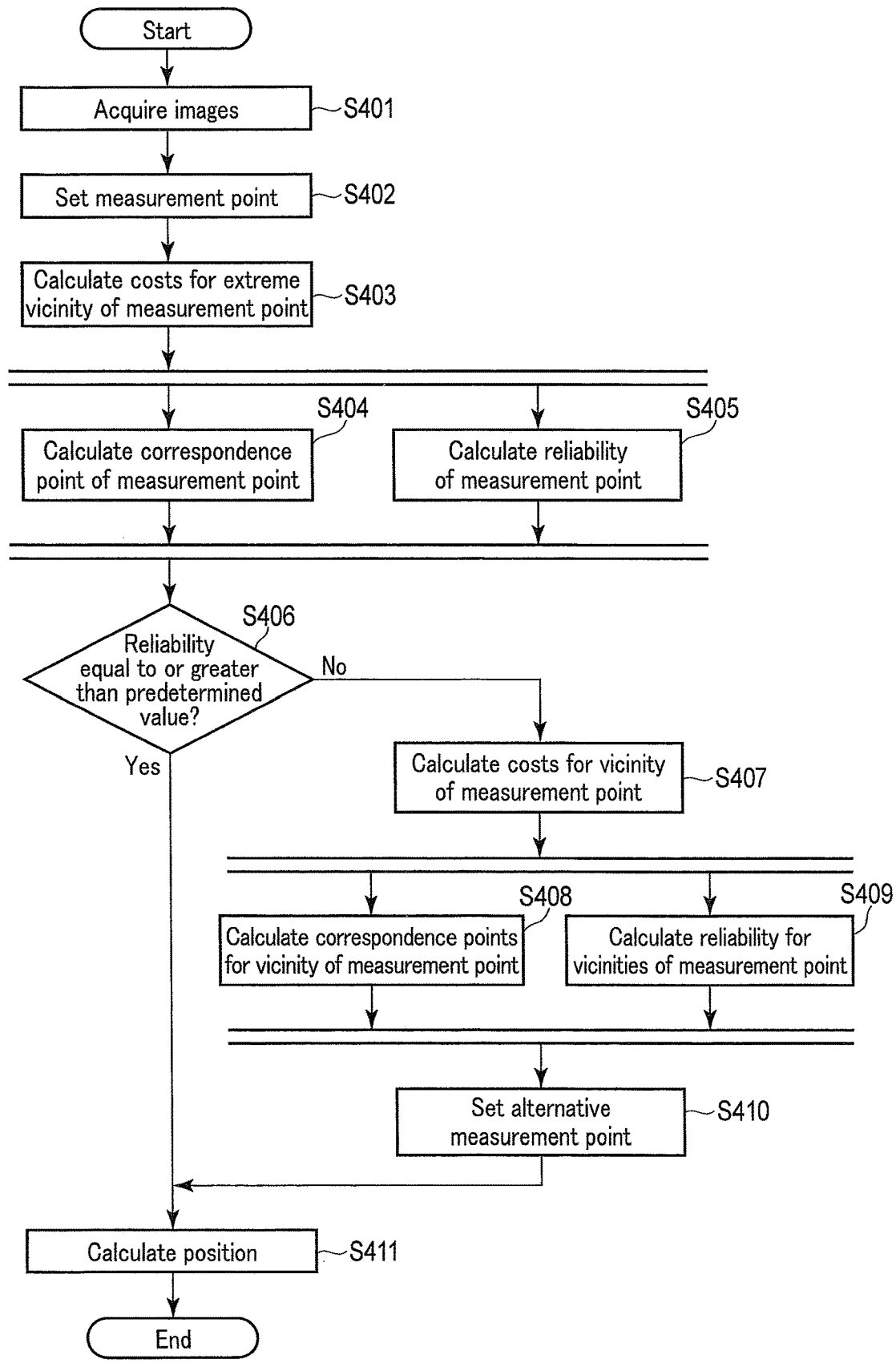
FIG. 9 is a flowchart schematically showing an example of an operation performed by an image processing apparatus according to a third modification of the first embodiment.

The third modification of the first embodiment of the present invention will be described. In the description below, reference will be made to how the third modification differs from the first embodiment. Therefore, the same symbols will be used to denote structural elements similar or corresponding to those of the first embodiment, and a description of such structural elements will be omitted. In the present modification, costs are calculated for points near the measurement point, only where the reliability of the measurement point is less than a predetermined value and an alternative measurement point is necessary, and calculations of correspondence points and reliabilities are performed. An operation of the image processing apparatus 10 according to the third modification of the first embodiment will be described with reference to the flowchart shown in FIG. 9.

In step S401, the image acquisition unit 11 acquires a first image and a second image. In step S402, the measurement point setting unit 13 acquires an instruction related to a measurement point from the instruction acquisition unit 12 the user enters, and sets the measurement point. In step S403, the evaluation value calculation unit 14 calculates costs as an evaluation value only for the measurement point set in step S402 and for the extreme vicinity thereof.

The processing in step S404 and the processing in step S405 are performed in parallel. In step S404, the correspondence point calculation unit 16 calculates a correspondence point for the measurement point on the first image. In step S405, the reliability calculation unit 15 calculates reliability for the measurement point on the first image. After step S404 and step S405, the processing proceeds to step S406.

In step S406, the alternative measurement point setting unit 17 determines whether the reliability of the set measurement point is equal to or greater than a predetermined threshold value. If the reliability is equal to or greater than the predetermined threshold value, the processing proceeds to step S411. On the other hand, if the reliability is less than the predetermined threshold value, the processing proceeds to step S407.

In step S407, the evaluation value calculation unit 14 calculates costs as an evaluation value for the vicinity of the measurement point set in step S402.

The processing in step S408 and the processing in step S409 are performed in parallel. In step S408, the correspondence point calculation unit 16 calculates a correspondence point for each of the points in the vicinity of the measurement point on the first image. In step S409, the reliability calculation unit 15 calculates reliability for each of the points in the vicinity of the measurement point on the first image. After step S408 and step S409, the processing proceeds to step S410.

In step S410, the alternative measurement point setting unit 17 sets an alternative measurement point in the vicinity of the measurement point, based on the reliabilities calculated in step S409. Subsequently, the processing advances to step S411.

In step S411, the position calculation unit 18 calculates three-dimensional coordinates, based on the measurement point or the alternative measurement point and on the correspondence point corresponding to that point. Subsequently, the display processing unit 19 causes the display device 33 to display necessary information.

According to the present modification, only when the reliability of the measurement point designated by the user is less than the predetermined value and an alternative measurement point becomes necessary, the costs, the correspondence points, and the reliabilities are calculated for the points located in the vicinity of the measurement point. As a result, the calculation amount can be reduced and the calculation time can be shortened. According to this modification as well, the same advantages as described above can be obtained. When the alternative measurement point is calculated, reliabilities may be calculated first, and correspondence points may be calculated only for points having high reliabilities.

Second Embodiment

The second embodiment of the present invention will be described. In the description below, reference will be made to how the second embodiment differs from the first embodiment. Therefore, the same symbols will be used to denote structural elements similar or corresponding to those of the first embodiment, and a description of such structural elements will be omitted. The second embodiment relates to processing performed when a plurality of measurement points are set. Even when a plurality of measurement points are set, alternative measurement points are set where the reliabilities of the measurement points are low, as in the first embodiment or in the modifications thereof. In the present embodiment, when alternative measurement points are set, the alternative measurement point setting unit 17 sets the alternative measurement points such that the relative positional relationship among the measurement points and the relative positional relationship among the alternative measurement points are maintained.

Figure 10:
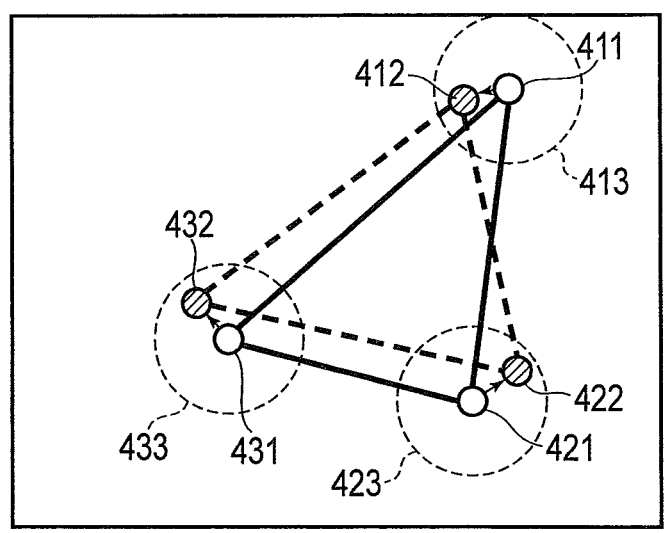
FIG. 10 is a diagram illustrating how an alternative measurement point is set according to a comparative example.

FIG. 10 schematically shows a comparative example where alternate measurement points are individually set for measurement points. In the example shown in FIG. 10, a first alternative measurement point 412 related to a first measurement point 411 is set as a high-reliability point in a first region 413, which is within a predetermined range from the first measurement point 411. Similarly, a second alternative measurement point 422 related to a second measurement point 421 is set as a high-reliability point in a second region 423, which is within a predetermined range from the second measurement point 421. A third alternative measurement point 432 related to a third measurement point 431 is set as a high-reliability point in a third region 433, which is within a predetermined range from the third measurement point 431. Since the first alternative measurement point 412, the second alternative measurement point 422 and the third alternative measurement point 432 are individually set such that their reliabilities are high, the directions of movement from the measurement points to the alternative measurement points are different. As a result, for example, the length of the line segment connecting one alternative measurement point and another alternative measurement point is different from that of the line segment connecting their corresponding measurement points. In addition, the area or volume of the region surrounded by the alternative measurement points is different from the area or volume of the region surrounded by the corresponding measurement points.

On the other hand, in the present embodiment, a combination of alternative measurement points is set such that the relative positional relationship between one measurement point and another measurement point and the relative positional relationship between the corresponding alternative measurement points are maintained. At this time, the combination of the alternative measurement points is determined such that the sum total of the reliabilities of the alternative measurement points is highest. The combination of the alternative measurement points may be determined based on the product of the reliabilities instead of the sum total thereof.

According to the present embodiment, the length of the line segment connecting one alternative measurement point and another alternative measurement point is substantially equal to that of the line segment connecting the corresponding measurement points. Alternatively, according to the present embodiment, the area or volume of the region surrounded by the alternative measurement points is substantially equal to the area or volume of the region surrounded by the measurement points.

An example of a method of setting alternative measurement points will be described with reference to the drawings. FIG. 11 schematically shows an example of alternative measurement points that are set in such a manner that two measurement points move in parallel. If the reliability is lower than a predetermined threshold value for either of a first measurement point 511 or a second measurement point 521, the alternative measurement point setting unit 17 sets a first alternative measurement point 512 and a second alternative measurement point 522 whose reliabilities are both equal to or greater than the threshold value. The first alternative measurement point 512 and the second alternative measurement point 522 are set at positions to which the first measurement point 511 and the second measurement point 521 move in parallel. Therefore, a distance 531 between the first measurement point 511 and the second measurement point 521 is equal to a distance 532 between the first alternative measurement point 512 and the second alternative measurement point 522.

Where the image acquisition device 31 is, for example, a stereo endoscope, the user may want to measure the size of an object, such as a tumor shown in an image. According to the present embodiment, the size of the object to be measured can be acquired accurately.

It is to be noted that the display device 33 may show a first guide line 514 passing through the first measurement point 511 and the first alternative measurement point 512. Similarly, the display device 33 may show a second guide line 524 passing through the second measurement point 521 and the second alternative measurement point 522. The display device 33 may show either one of the first guide line 514 and the second guide line 524, or may show both of them.

FIG. 12 schematically shows an example of alternative measurement points that are set in such a manner that two measurement points rotate. If the reliability is lower than a predetermined threshold value for either of the a measurement point 561 or a second measurement point 571, the alternative measurement point setting unit 17 sets a first alternative measurement point 562 and a second alternative measurement point 572 whose reliabilities are both equal to or greater than the threshold value. The first alternative measurement point 562 and the second alternative measurement point 572 are set at positions to which the first measurement point 561 and the second measurement point 571 rotate. Therefore, a distance 581 between the first measurement point 561 and the second measurement point 571 is substantially equal to a distance 582 between the first alternative measurement point 562 and the second alternative measurement point 572. It is noted that both rotational movement and parallel movement may be used.

It is preferable that the relative positional relationship between the measurement points and the relative positional relationship between the alternative measurement points be equal to each other. However, especially where alternative measurement points are set for movements including rotation, the coordinates obtained after the movements may not necessarily be integer values. For this reason, it is often impossible to strictly set the relative positional relationship between the measurement points and the relative positional relationship between the alternative measurement points such that they are exactly equal to each other. In the present embodiment, the relative positional relationship between the measurement points and the relative positional relationship between the alternative measurement points do not have to be exactly equal to each other. It is sufficient that these relationships are fully maintained.

Figure 13:
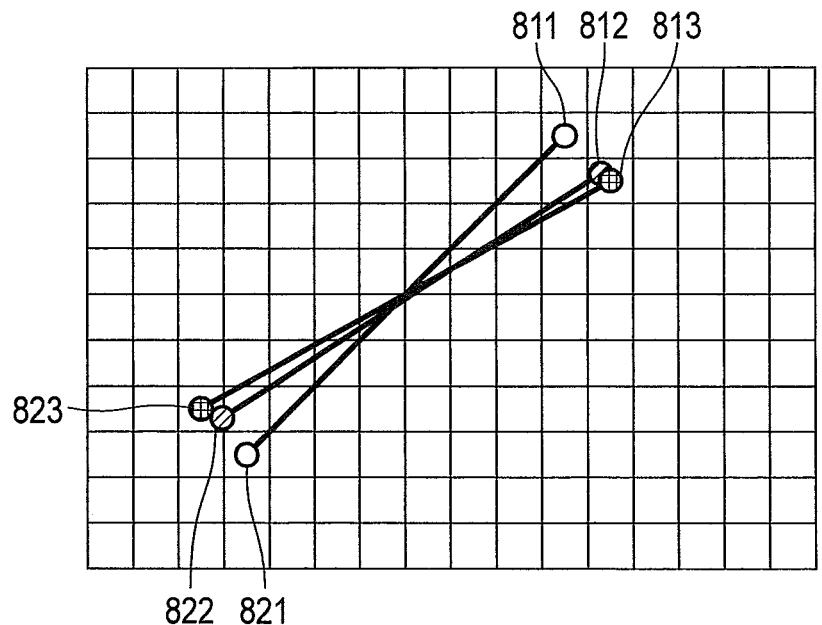
FIG. 13 is a diagram illustrating an example of how alternative measurement points are set according to the second embodiment.

In the example shown in FIG. 13, it is assumed that the grid indicates pixels, for example. In the example shown in FIG. 13, when a first measurement point 811 and a second measurement point 821 indicated by outlined circles are rotated, they move, with the decimal precision, to a first point 812 and a second point 822 indicated by hatched circles. However, if the movement is considered based on integer pixels, a first alternative measurement point 813 and a second alternative measurement point 823 indicated by the grid circles are set in practice. At this time, the positional relationship between the first point 812 and the first alternative measurement point 813 and the positional relationship between the second point 822 and the second alternative measurement point 823 may not be equal to each other. Therefore, the relative positional relationship between the measurement points and the relative positional relationship between the alternative measurement points may not be exactly the same. In the present embodiment, however, it is sufficient that the positional relationships are fully maintained.

Figure 14:
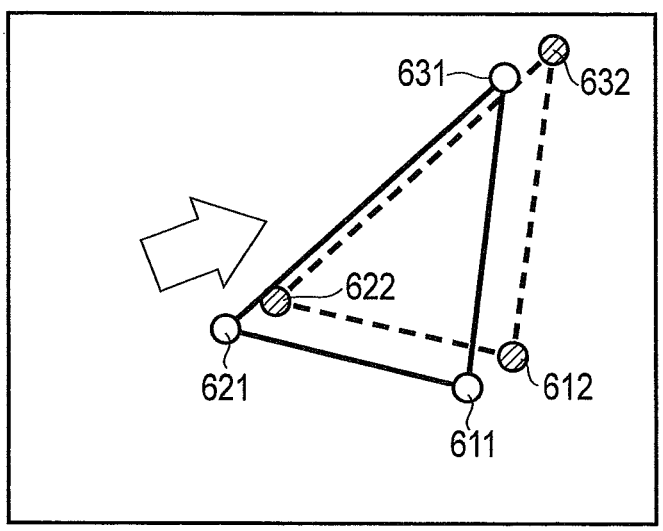
FIG. 14 is a diagram illustrating an example of how alternative measurement points are set according to the second embodiment.

FIG. 14 schematically shows an example of alternative measurement points that are set in such a manner three measurement points move in parallel. If the reliability is lower than a predetermined threshold value for any one of a first measurement point 611, a second measurement point 621 and a third measurement point 631, the alternative measurement point setting unit 17 sets a first alternative measurement point 612, a second alternative measurement point 622 and a third alternative measurement point 632 whose reliabilities are all equal to or greater than the threshold value. The first alternative measurement point 612, the second alternative measurement point 622 and the third alternative measurement point 632 are set at positions to which the first measurement point 611, the second measurement point 621 and the third measurement point 631 move in parallel. Therefore, the intervals between the alternative measurement points, the area of the region surrounded by the alternative measurement points or the like are respectively equal to the intervals between the measurement points, the area of the region surrounded by the measurement points or the like.

Figure 15:
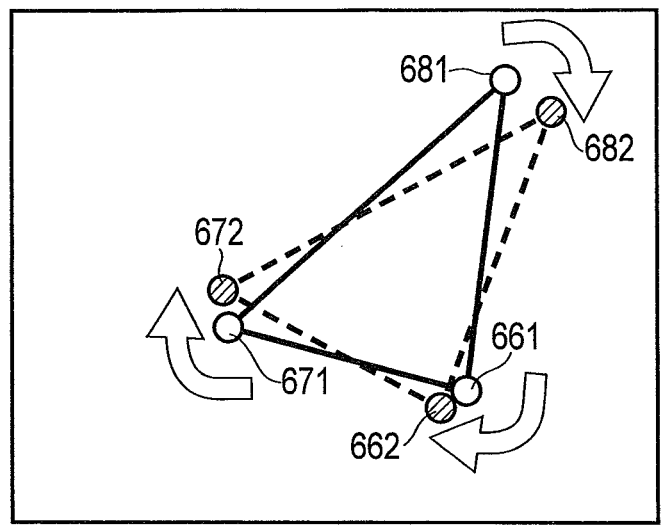
FIG. 15 is a diagram illustrating an example of how alternative measurement points are set according to the second embodiment.

FIG. 15 schematically shows an example of alternative measurement points that are set in such a manner that three measurement points rotate. If the reliability is lower than a predetermined threshold value for any one of a first measurement point 661, a second measurement point 671 and a third measurement point 681, the alternative measurement point setting unit 17 sets a first alternative measurement point 662, a second alternative measurement point 672 and a third alternative measurement point 682 whose reliabilities are all equal to or greater than the threshold value. The first alternative measurement point 662, the second alternative measurement point 672 and the third alternative measurement point 682 are set substantially at positions to which the first measurement point 661, the second measurement point 671 and the third measurement point 681 rotate. Therefore, the intervals between the alternative measurement points, the area of the region surrounded by the alternative measurement points or the like are substantially equal to the intervals between the measurement points, the area of the region surrounded by the measurement points or the like.

The relative positional relationship among the Measurement points and the relative positional relationship among the alternative measurement points do not have to be exactly equal to each other. It is sufficient that these relationships are properly maintained. As can be seen from this, the alternative measurement points are not the same as the measurement points designated by the user but are points for finding a result that can allow for the difference. Therefore, even if the position of an actual alternative measurement point is away from the position of a measurement point by a few pixels or so, a sufficiently meaningful result can be obtained with respect to the distance, area, etc.

A method of determining alternative measurement points will be further described. The alternative measurement points may be determined with priority given to reliabilities, such that the reliabilities of the measurement points increase as a whole. Alternative measurement points that enable the reliabilities to increase as a whole may be determined, for example, as a combination of alternative measurement points that enable the sum total or average of the reliabilities to be highest as described above, or as a combination of alternate measurement points that enable the product of the reliabilities to be highest.

The alternative measurement points may be determined with priority given to the proximity between the measurement points and the alternative measurement points, in place of the reliabilities described above. In other words, priority may be given to the proximity to the measurement points designated by the user. For example, a combination of alternative measurement points may be determined such that the reliabilities of alternative measurement points are all equal to or greater than a predetermined threshold and such that the sum of distances between measurement points and alternative measurement points is minimized.

Figure 16:
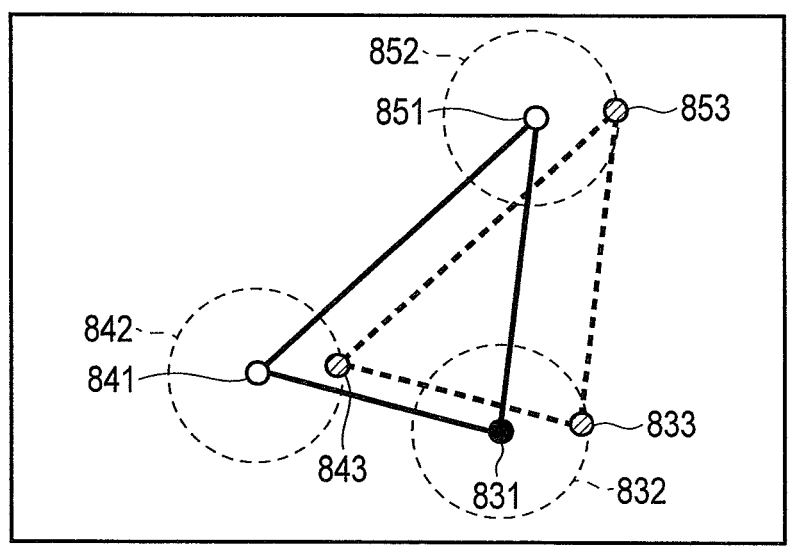
FIG. 16 is a diagram illustrating an example of how alternative measurement points are set according to the second embodiment where priority is given to reliability.

A case where priority is given to the reliabilities and a case where priority is given to the proximity between measurement points and alternative measurement points will be described with reference to FIGS. 16 and 17. FIG. 16 shows an example of the case where priority is given to the reliability. Let us assume that a first measurement point 831, a second measurement point 841, and a third measurement point 851 are designated by the user. The reliabilities of the second measurement point 841 and third measurement point 851 indicated by outlined circles are assumed to be sufficiently high, for example, 90%. On the other hand, the reliability of the first measurement point 831 indicated by the black circle is less than the predetermined value, for example, 50%. Since the first measurement point 831 is low in reliability, alternative measurement points are set. A first alternative measurement point 833 corresponding to the first measurement point 831 is determined to be within a first search region 832 around the first measurement point 831. Likewise, a second alternative measurement point 843 corresponding to the second measurement point 841 is determined in a second search region 842 around the second measurement point 841, and a third alternative measurement point 853 is corresponding to the third measurement point 851 is determined in a third search region 852 around the third measurement point 851.

Since priority is given to the reliabilities in this case, alternative measurement points are determined inside the respective search regions such that the sum total of the reliabilities is maximal, irrespective of the distances from the measurement points. The reliabilities of the first alternative measurement point 833, second alternative measurement point 843 and third alternative measurement point 853 indicated by hatched circles in FIG. 16 are sufficiently high, for example, 90%, In the case where priority is given to the reliabilities, the alternative measurement points may be away from the measurement points to a certain extent, but the accuracy of various kinds of measurement is improved by using the alternative measurement points selected as above. By adjusting the sizes of the search regions, it is possible to adjust how far the alternative measurement points may be away from the measurement points. The search regions can be set properly.

FIG. 17 shows an example of a case where priority is given to the proximity between measurement points and alternative measurement points. In the example shown in FIG. 17 as well, alternative measurement points are set because the reliabilities of a second measurement point 841 and a third measurement point 851 are sufficiently high but the reliability of a first measurement point 831 is low, as in the case shown in FIG. 16. In this case, a combination of alternative measurement points is determined such that the reliabilities of a first alternative measurement point 834, a second alternative measurement point 844, and a third alternative measurement point 854 are all equal to or greater a predetermined threshold value, for example, 80%, and such that the sum of distances between the alternative measurement points and their corresponding measurement points is minimized. When priority is given to the proximity between measurement points and alternative measurement points, the reliabilities may be lower than those of the case where priority is given to the reliabilities, but points close to the measurement points designated by the user are measured.

<Display Example>

An example of what is displayed on the display device 33 in the present embodiment is shown in FIG. 18. In the example shown in FIG. 18, it is assumed that the reliability of a first measurement point 711 is less than a predetermined threshold value and the reliability of a second measurement point 721 is equal to or greater than the predetermined threshold value. In this case, the alternative measurement point setting unit 17 sets a first alternative measurement point 712 and a second alternative measurement point 722 whose reliabilities are equal to or greater than the predetermined value. On the screen of the display device 33, the first measurement point having a reliability lower than the threshold value may be displayed in a color different from the color of the second measurement point, the first alternative measurement point and the second alternative measurement point which have a reliability equal to or greater than the threshold value. In addition, the first measurement point 711 and second measurement point 721 selected by the user may be displayed in a color different from the color of the first alternative measurement point 712 and second alternative measurement point 722 set by the alternative measurement point setting unit 17. Further, the distance the position calculation unit 18 calculates between the first measurement point 711 and the second measurement point 721 may be displayed as a first distance display 731, for example, and the distance between the first alternative measurement point 712 and the second alternative measurement point 722 may be displayed as a second distance display 732, for example. Also, a first guide line 714 passing through the first measurement point 711 and the first alternative measurement point 712 and a second guide line 724 passing through the second measurement point 721 and the second alternative measurement point 722 may be displayed. Either one of the first guide line 714 and the second guide line 724 may be displayed, or both of them may be displayed.

As described above, a point the user designates as a measurement point, an alternative measurement point having a high reliability, a distance, a guide line, etc. are displayed simultaneously, so that the user can easily judge the validity of the alternative measurement point and the validity of the distance calculated based on the alternative measurement point.

It should be noted that only the first image may be displayed on the display device 33; alternatively, both the first image and the second image may be displayed on the display device 33.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus comprising
at least one circuit configured to:
acquire a plurality of images, including at least a first image and a second image obtained by photographing a subject from different viewpoints;
acquire an instruction from a user;
set on the first image a measurement point for which three-dimensional coordinates of the subject are required, based on the instruction;
calculate a correspondence point which is on the second image and which corresponds to the measurement point, by matching;
calculate a reliability of the matching between the measurement point and the correspondence point as a measurement point reliability; and
set on the first image an alternative measurement point enabling a reliability higher than that of the measurement point reliability, instead of the measurement point, when the measurement point reliability is less than a predetermined threshold value,
wherein the at least one circuit is configured to:
set a plurality of measurement points; and
set a plurality of alternative measurement points corresponding to the measurement points in such a manner that a relative positional relationship among the measurement points and a relative positional relationship among the alternative measurement points are maintained.

2. The image processing apparatus according to claim 1, wherein the at least one circuit further configured to
calculate three-dimensional coordinates of any one of the measurement points and the alternative measurement points by using positions at which the first image and the second image are photographed and by using a parallax,
wherein the parallax is any one of a parallax between the measurement point for which the three-dimensional coordinates are calculated and the corresponding correspondence point and a parallax between the alternative measurement point for which the three-dimensional coordinates are calculated and a point which is on the second image and which corresponds to the alternative measurement point for which the three-dimensional coordinates are calculated.

3. The image processing apparatus according to claim 1, wherein the at least one circuit is configured to limit regions in which search is conducted for the respective alternative measurement points, by using features of the first image.

4. The image processing apparatus according to claim 3, wherein the regions in which search is conducted are any one of a region set along an edge detected in the first image, a region not crossing the edge, a region whose contrast difference to the corresponding measurement point is within a predetermined value, and a region whose color difference to the corresponding measurement point is within a predetermined value.

5. The image processing apparatus according to claim 1, wherein the at least one circuit is configured to set the alternative measurement points such that reliabilities of the alternative measurement points are highest as a whole in respective search areas around the measurement points.

6. The image processing apparatus according to claim 1, wherein the at least one circuit is configured to set the alternative measurement points such that each of the reliabilities of the alternative measurement points is higher than a predetermined threshold value and such that distances between the measurement points and the alternative measurement points are shortest.

7. An image processing apparatus comprising:
at least one circuit configured to:
    acquire a plurality of images, including at least a first image and a second image obtained by photographing a subject from different viewpoints;
    acquire an instruction from a user;
    set on the first image a measurement point for which three-dimensional coordinates of the subject are required, based on the instruction;
    calculate a correspondence point which is on the second image and which corresponds to the measurement point, by matching;
    calculate a reliability of the matching between the measurement point and the correspondence point as a measurement point reliability; and
    set on the first image an alternative measurement point enabling a reliability higher than that of the measurement point reliability, instead of the measurement point, when the measurement point reliability is less than a predetermined threshold value,
wherein the at least one circuit is further configured to:
cause a display device to display the first image together with the measurement point and the alternative measurement point, and
cause the display device to display a guide line which is along a movement direction from the measurement point to the alternative measurement point, together with the measurement point and the alternative measurement point.

8. The image processing apparatus according to claim 7, wherein the at least one circuit is further configured to:
    cause the display device to display the second image together with the correspondence point.

9. A storage medium, which non-transitory stores a computer-readable image processing program, causing a computer to:
    acquire a plurality of images, including at least a first image and a second image obtained by photographing a subject from different viewpoints;
    acquire an instruction from a user;
    set on the first image a measurement point for which three-dimensional coordinates of the subject are required, based on the instruction;
    calculate a correspondence point which is on the second image and which corresponds to the measurement point, by matching;
    calculate a reliability of the matching between the measurement point and the correspondence point as a measurement point reliability; and
    set on the first image an alternative measurement point enabling a reliability higher than the measurement point reliability, instead of the measurement point, when the measurement point reliability is less than a predetermined threshold value,
wherein the computer-readable image processing program further causes the computer to:
    set a plurality of measurement points; and
    set a plurality of alternative measurement points corresponding to the measurement points in such a manner that a relative positional relationship among the measurement points and a relative positional relationship among the alternative measurement points are maintained.

10. A storage medium, which non-transitory stores a computer-readable image processing program, causing a computer to:
    acquire a plurality of images, including at least a first image and a second image obtained by photographing a subject from different viewpoints;
    acquire an instruction from a user;
    set on the first image a measurement point for which three-dimensional coordinates of the subject are required, based on the instruction;
    calculate a correspondence point which is on the second image and which corresponds to the measurement point, by matching;
    calculate a reliability of the matching between the measurement point and the correspondence point as a measurement point reliability; and
    set on the first image an alternative measurement point enabling a reliability higher than the measurement point reliability, instead of the measurement point, when the measurement point reliability is less than a predetermined threshold value;
wherein the computer-readable image processing program further causes the computer to:
cause a display device to display the first image together with the measurement point and the alternative measurement point, and
cause the display device to display a guide line which is along a movement direction from the measurement point to the alternative measurement point, together with the measurement point and the alternative measurement point.

* * * * *